United States Patent
Mino

(10) Patent No.: US 10,209,612 B2
(45) Date of Patent: Feb. 19, 2019

(54) DISPLAY SYSTEM FOR AMBIENT LIGHT DISCRIMINATION

(71) Applicants: Nelson Mino, New South Wales (AU); William Hutchinson, New South Wales (AU); THOMAS ELECTRONICS OF AUSTRALIA PTY LTD, New South Wales (AU)

(72) Inventor: Nelson Mino, New South Wales (AU)

(73) Assignee: THOMAS GLOBAL SYSTEMS (IP) PTY LTD, Regents Park (AU)

( * ) Notice: Subject to any disclaimer, the term of this patent is extended or adjusted under 35 U.S.C. 154(b) by 0 days.

(21) Appl. No.: 15/024,632

(22) PCT Filed: Sep. 25, 2014

(86) PCT No.: PCT/AU2014/000939
§ 371 (c)(1),
(2) Date: Mar. 24, 2016

(87) PCT Pub. No.: WO2015/042646
PCT Pub. Date: Apr. 2, 2015

(65) Prior Publication Data
US 2016/0231646 A1    Aug. 11, 2016

(30) Foreign Application Priority Data
Sep. 25, 2013 (AU) ................................ 2013903692

(51) Int. Cl.
G03B 21/60    (2014.01)
G02B 6/08     (2006.01)
G02F 1/1335   (2006.01)

(52) U.S. Cl.
CPC .............. *G03B 21/60* (2013.01); *G02B 6/08* (2013.01); *G02F 1/133524* (2013.01)

(58) Field of Classification Search
CPC .......... G03B 21/60; G03B 21/56; G02B 6/08; G02B 6/04
USPC ................................................... 359/449, 459
See application file for complete search history.

(56) References Cited

U.S. PATENT DOCUMENTS

| | | | |
|---|---|---|---|
| 6,535,674 B2 | 3/2003 | Veligdan | |
| 7,742,230 B2 * | 6/2010 | Uchida | G02B 5/0236 359/443 |
| 9,046,756 B1 * | 6/2015 | Marason | G03B 21/602 |
| 2005/0088743 A1 * | 4/2005 | Sawayama | G02B 5/124 359/530 |
| 2006/0098279 A1 * | 5/2006 | Yamauchi | G03B 21/56 359/449 |
| 2008/0285125 A1 * | 11/2008 | Lee | G02B 6/08 359/449 |

(Continued)

FOREIGN PATENT DOCUMENTS

WO    2008/144389 A1    6/2009

*Primary Examiner* — Christopher Mahoney
(74) *Attorney, Agent, or Firm* — Whitham & Cook, P.C.

(57) ABSTRACT

A display system for ambient light discrimination comprising: a planar waveguide comprising a plurality of collocated optic fibers wherein, the planar waveguide is adapted to guide incident light within the incidence angle acceptance range and wherein the planar waveguide is adapted to guide light along a bias trajectory, wherein, in use, the display system is adapted for discriminating against incident light outside an incidence angle acceptance range.

19 Claims, 5 Drawing Sheets

(56) References Cited

U.S. PATENT DOCUMENTS

| | | |
|---|---|---|
| 2009/0153958 A1 | 6/2009 | Huibers et al. |
| 2009/0232509 A1* | 9/2009 | Heikenfeld ............ G02B 5/124 |
| | | 398/118 |
| 2013/0135750 A1* | 5/2013 | Walker, Jr. ............ G02B 5/206 |
| | | 359/641 |

* cited by examiner

DISPLAY SYSTEM FOR AMBIENT LIGHT DISCRIMINATION

FIELD OF THE INVENTION

The present invention relates to a display screen and in particular to a sunlight readable front- or rear-projection screen which is applicable to day and night digital signage or display applications in commercial or defence industries.

The invention has been developed primarily for use with image projector display systems and will be described hereinafter with reference to this application. However, it will be appreciated that the invention is not limited to this particular field of use.

BACKGROUND

Any discussion of the background art throughout the specification should in no way be considered as an admission that such background art is prior art nor that such background art is widely known or forms part of the common general knowledge in the field, either in Australia or worldwide.

Existing projection screens are best suited to dark environments having minimum ambient light sources. Existing projection screens are designed to reflect light in a diffuse manner. There are various materials and methods available to maximize this reflected light diffused by the projection screen, inherently increasing the apparent brightness of any image projected on it. Disadvantageously however, black levels of the picture become brighter with a minimal ambient light source and saturation of the projected image occurs during high ambient light sources, such as direct sunlight.

Attempts have been made to overcome such problems including through attempting to reduce the amount of light reflected back from the projection surface such as by darkening the projection screen material. However, such an approach disadvantageously results in lowering the capability of the projection surface to produce high brightness images.

The present invention seeks to provide a display system for ambient light discrimination, which will overcome or substantially ameliorate at least some of the deficiencies of the prior art, or to at least provide an alternative.

SUMMARY

It is an object of the present invention to overcome or ameliorate at least one or more of the disadvantages of the prior art, or to provide a useful alternative.

There is provided a display system 100 having sunlight readable properties so as to be applicable to day and night digital signage or displays for display applications in commercial or defence industries. More specifically the invention use a planar waveguide adjacent a conventional high contrast projection reflector so as to be adapted to discriminate, based on incidence angle, between a high brightness directional source like sunlight, and the intended projected image from the image projector. The incident ambient light e.g. sunlight, strikes the display at an angle of incidence which is outside the acceptance angle of the waveguide, and thus the incident ambient light reflects off the front surface of the projection screen, therefore preventing the ambient light (sunlight) from saturating the projection surface material. The user location and the location of the image projector are designed to be located within the incidence angle acceptance range of the planar waveguide. The light from the image projector proceeds to illuminate the reflector surface material and is reflected back through the planar waveguide and out to the user within the angle of acceptance.

According to a first aspect, there is provided a display system for ambient light discrimination. The display system may comprise a planar waveguide. The planar waveguide may comprise a plurality of collocated optic fibres. The planar waveguide may be adapted to guide incident light within the incidence angle of acceptance range. The planar waveguide may be further adapted to guide light along a bias trajectory. In use, the display system may be adapted for discriminating against incident light outside an incidence angle acceptance range.

According to an arrangement of the first aspect, there is provided a display system for ambient light discrimination, comprising a planar waveguide comprising a plurality of collocated optic fibres wherein, the planar waveguide is adapted to guide incident light within the incidence angle of acceptance range and wherein the planar waveguide is adapted to guide light along a bias trajectory, wherein, in use, the display system is adapted for discriminating against incident light outside an incidence an acceptance range.

According to a second aspect, there is provided, a display system for ambient light discrimination. The display system may comprise a projector for projecting an image onto a projection screen. The display system may further comprise a planar waveguide. The waveguide may comprise a plurality of collocated optic fibres. The waveguide may be located adjacent the projection screen. The waveguide may be adapted to guide light from the projection screen to a display surface. The waveguide may be adapted to guide incident light originating from the projection screen and impinging on the waveguide within an incidence angle acceptance range. The waveguide may be adapted to guide light along a bias trajectory to the display surface. In use, the display system may be adapted for discriminating against incident light outsides an incidence angle acceptance range.

According to an arrangement of the second aspect, there is provide a display system for ambient light discrimination comprising: a projector for projecting an image onto a projection screen; a planar waveguide comprising a plurality of collocated optic fibres, said planar waveguide located adjacent said projection screen and adapted to guide light from said projection screen to a display surface; wherein, the planar waveguide is adapted to guide incident light originating from said projection screen and impinging on said waveguide within an incidence angle acceptance range and wherein the planar waveguide is adapted to guide light along a bias trajectory to said display surface such that, in use, the display system is adapted for discriminating against incident light outside an incidence angle acceptance range.

The bias trajectory may be substantially horizontal or perpendicular to the surface of the planar waveguide. The plurality of optical fibres may be aligned at an oblique angle. The oblique angle may be adapted so as to favour the viewing angle beneath the horizontal or for the design eye points of the display system. The display system may further comprise a plurality of retro-reflectors which by their nature reflect the light back at an angle within the incidence angle of acceptance range of the waveguide and therefore maximising light efficiency of the display system. The plurality of the reflectors may each be reflective beads. The beads may be micro sized spheres of a selected refractive index. In particular arrangements the beads may be formed of a glass material. The beads may be embedded in a substrate material having a lower refractive index to the refractive index of the beads. The substrate material, together with the beads, may be produced to make high gain front projection screens having gain between about 3 to about 3.2 and above at a perpendicular angle. Reflection losses due to scattered light from other sources can be neglected as the planar waveguide will only accept retro-reflected light within the acceptance angle of the waveguide. The remaining scattered light which normally causes reduced contrast and image sharpness is rejected by this retro-reflector and waveguide coupling.

In use, the display system may be adapted for discriminating against incident light outside an incidence angle acceptance range.

The display system may be adapted to reflect incident light outside the incidence angle acceptance range.

The display system may be adapted to refract incident light within an incidence angle acceptance range.

The display system may comprise a planar waveguide wherein, in use, the planar waveguide may be adapted to guide incident light within an incidence angle acceptance range.

In use, the planar waveguide may be adapted to propagate light along a bias trajectory.

The bias trajectory may be substantially perpendicular a surface of the planar waveguide.

The bias trajectory may be configured in accordance with a desired viewing angle.

The bias trajectory may be offset an axis substantially perpendicular a surface of the planar waveguide.

The light propagation trajectory may be uniform across the planar waveguide.

The light propagation trajectory has a focal point.

The planar waveguide may comprise a plurality of collocated optic fibres.

The display system may further comprise a retro-reflector adjacent the planar waveguide wherein, in use, the retro-reflector is orientated to reflect light at the same incidence angle back within the acceptance angle of the planar waveguide.

The reflector may be orientated to receive light from the planar waveguide.

The reflector may comprise a surface configured in accordance with a desired diffusion characteristic.

The display system may be configured in accordance with a desired refractive index.

The display system may further comprise a surface treatment selected in accordance with the desired refractive index.

Other aspects of the invention are also disclosed.

BRIEF DESCRIPTION OF THE DRAWINGS

Notwithstanding any other forms which may fall within the scope of the present invention, a preferred embodiments of the invention will now be described, by way of example only, with reference to the accompanying drawings in which.

DEFINITIONS

Figure 1:
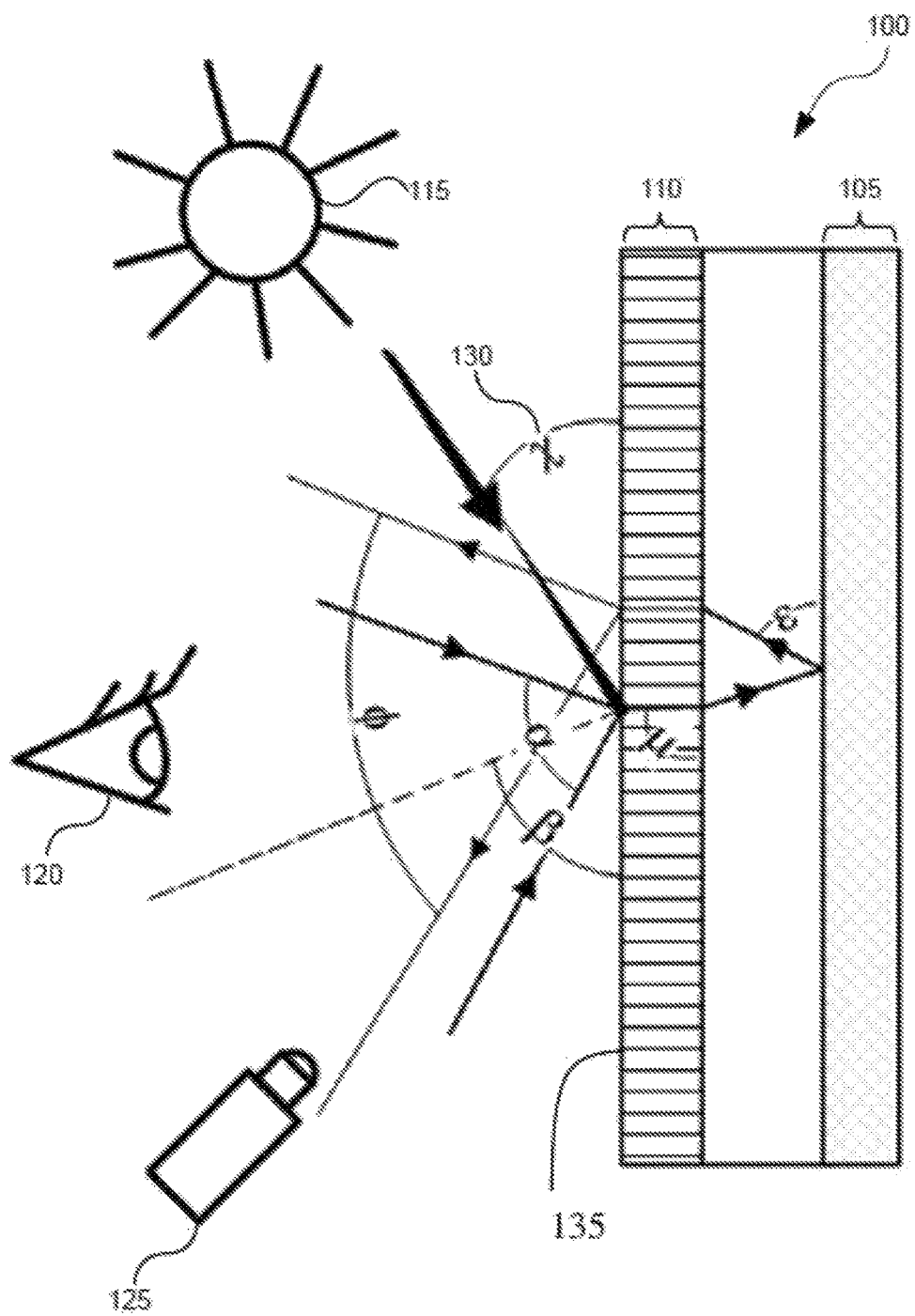
FIG. 1 shows a display system in accordance with a preferred embodiment of the present invention.

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity. The use of the word "about" to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" cause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" "and/or" shall be interpreted as being inclusive, i.e., the inclusion of at least one, but also including more than one, of a number or list of elements, and optionally, additional unlisted items. Only terms clearly indicated to the contrary, such as "only one of" or "exactly one of," when used in the claims, "consisting of" will refer to the inclusion of exactly one element of a number or list of elements. In general, the term "or" as used herein shall only be interpreted as indicating, exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including, more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

DETAILED DESCRIPTION

It should be noted in the following description that like or the same reference numerals in different embodiments denote the same or similar features.

Turning to FIG. 1, there is shown a display system 100 for ambient light discrimination. As will become apparent from the description below, the display system 100 has advantageous viewing properties in high ambient light environments, such as for display devices exposed to direct sunlight, for example.

As will be described in further detail below, the display system 100 advantageously employs aspects relating to the physical characteristic of total internal reflection to propagate light emanating from a known image projection location and viewing angle and to discriminate against ambient (and generally directional) light. The display system 100 may be configured in accordance with appropriate geometry to discriminate against direct sunlight, no matter the position of the sun. The display system 100 has application for use in any indoor and/or outdoor projection system requirement such as in car dashboard displays or outdoor information signage The display system 100 comprises a planar waveguide 110. The planar waveguide is adapted to guide light within an incidence angle acceptance range ($\alpha$) so as to discriminate between light for viewing purposes and ambient light. In other words, the display system 100 advantageously utilises the planar waveguide 110 to discriminate between incident light angles so as to be adapted for rejecting ambient light having large incident angles while allowing light having less incident angles to propagate.

In the embodiment presented in FIG. 1, there is given an ambient light source 115, represented as the sun. Also, there is given the user 120. Also, in the embodiment presented, there is described the application where light is projected from a projector 125 for viewing by the user 120. In this application, the user 120 is able to substantially view the display image projected by the projector 125 on display surface 135 despite the high intensity light striking the display system 100 from the sun 115.

Now, the planar waveguide 110 is adapted to guide light along a bias trajectory ($\mu$). In the embodiment given, the bias trajectory ($\mu$) is shown as being substantially horizontal or perpendicular to the surface of the planar waveguide 110.

Now, light received outside of the incidence angle acceptance range ($\alpha$) such as sunlight typically having a large incidence angle ($\chi$), is substantially reflected away from the display system 100. In the example given, the light emanating from the ambient light source 115, on account of falling outside the incidence angle acceptance range ($\alpha$) is reflected away from the front surface of the display system 100.

Conversely, light striking the surface of the display system 100 within the incidence angle acceptance range ($\alpha$) is refracted within the planar waveguide 110 and guided by the planar waveguide along the bias trajectory ($\mu$) to display surface 135.

Now, in the exemplary embodiment given, the light biased by the planar waveguide 110 propagates through the planar waveguide 110 and strikes reflector 105 adjacent the planar waveguide 110. The light striking the reflector 105 subsequently reflects back within the incidence angle of acceptance, through the planar waveguide 110 to display surface 135 towards the user 120 so as to be viewed by the user 120 positioned within viewing angle ($\phi$).

The offset of the reflector 105 from the planar waveguide 110 may be configured according to the application. Generally the offset is adapted to control the focus of the display system 100 wherein the closer the reflector 105 to the planar waveguide 110, the less the diffusion of light from the planar waveguide 110 prior to reflection by the reflector 105. In certain embodiments, the planar waveguide 110 and the reflector 105 may be directly adjacent without a gap there between. In other embodiments, the gap between the planar waveguide 110 and the reflector 105 may be an air gap so as to present a medium of similar density on either side of the planar waveguide 110 preserve the angle of eminence of light therefrom in accordance with the angle of incidence thereinto. In other embodiments, mediums of other density may be employed between the planar waveguide 110 and the reflector 105. In further embodiments, the surface properties of the reflector 105 may be further configured to control the angle ($\epsilon$) of diffusion.

Now, in one embodiment, the viewing angle ($\phi$) may be configured depending on the desired application. For example, for an overhead advertising display board, it may be assumed that users of the overhead advertising display board will be viewing the overhead advertising display board from substantially beneath the overhead advertising display board, that is, from beneath the horizontal. Similarly, where the display system 100 is a vehicle dashboard, it may be assumed that the driver views the vehicle dashboard from an elevated position that is above the horizontal.

As such, the bias trajectory of the display system may be configured so as to prefer a predetermined viewing angle above or beneath the horizontal and, in certain embodiments, advantageously be up to provide for greater ambient light discrimination.

For example where the viewing angle is below the horizontal, the planar waveguide 110 may be adapted so as to bias light at an angle from the horizontal.

In one embodiment, the planar waveguide 110 comprises a plurality of optic fibres, collocated so as to form a plane. In this manner, during the manufacture of the planar waveguide 110, the optic fibres may be set at an oblique angle so as to favour the viewing angle beneath the horizontal.

It should be noted thin in this embodiment, even if certain ambient light from the ambient light source 115 were refracted within the planar waveguide 110 as opposed to being substantially reflected in the manner described above, on account of the bias angle of the planar waveguide 110, such ambient refracted light may be further discriminated against by having a trajectory ill-suited for acceptance by the obliquely set optic fibres of the planar waveguide ones 110.

Furthermore, in certain embodiments, the planar waveguide 110 may be configured not only with a vertical bias in the manner described above so as to prefer viewing angle above or beneath the vertical, but may also be configured with a lateral bias. Specifically, where it may be assumed the viewer 120 would be viewing the display system 100 lateral offset, such as where the display system 100 is located adjacent a road or the like such that motorists view the display system 100 from the right or left hand side of the display system 100, the planar waveguide 110 maybe biased so as to favour the viewing angle from the right or leaf hand side of the display system 100.

In a yet further embodiment, as opposed to the bias of the planar waveguide 100 being uniformly biased about the vertical and/or the horizontal, in one embodiments, the planar waveguide 100 may be biased non-uniformly about at point, such as substantially within the centre of planar waveguide 110 so as to focus or dilate the viewing angle.

In further embodiments, the bias of the planar waveguide 100 may be configured in accordance with the orientation of the display system 100 such as where the display system 100 is required to be mounted at an angle with respect to the user, such as where the display system is mounted as a vehicle dashboard on an angled dash, vehicle heads up display on an angled windshield or the like.

It should be noted that the arrangement given in FIG. 1 is exemplary only. In other embodiments, the projector 125 may be located behind the planar waveguide 110 wherein the reflector 105 is orientated at an angle such that reflected light is reflected towards the planar waveguide 110. Such an arrangement may be advantageous for application in car dashboards or the like where they may not be sufficient room for a projector.

In a further embodiment, the reflector 105 may be substantially transparent so as to allow for heads up display application.

In certain embodiments, the material is employed by the display system 100 may be adapted to configure the refractive index so as to control the angle of discrimination. In one manner, the density of the material may be configured so as to configure the refractive index of the display system 100. In one embodiment, the display system 100 comprises a surface treatment (not shown) having a property that is adapted for configuring the refractive index of the display system 100. By configuring the refractive index of the display system 100, one can further controlled the incidence angle acceptance range ($\alpha$) so as to effectively discriminate against ambient incoming light.

In one embodiment, the surface of the display system 100 may be configured so as to reduce the intensity of light reflected therefrom, such as by comprising a matte type surface treatment.

In particular arrangements the display system comprises a planar waveguide comprising a plurality of collocated optic fibres wherein, the planar waveguide is adapted to guide incident light within the incidence angle acceptance range and wherein the planar waveguide is adapted to guide light along a bias trajectory, wherein, in use, the display system is adapted for discriminating against incident light outside an incidence angle acceptance range.

Figure 2:
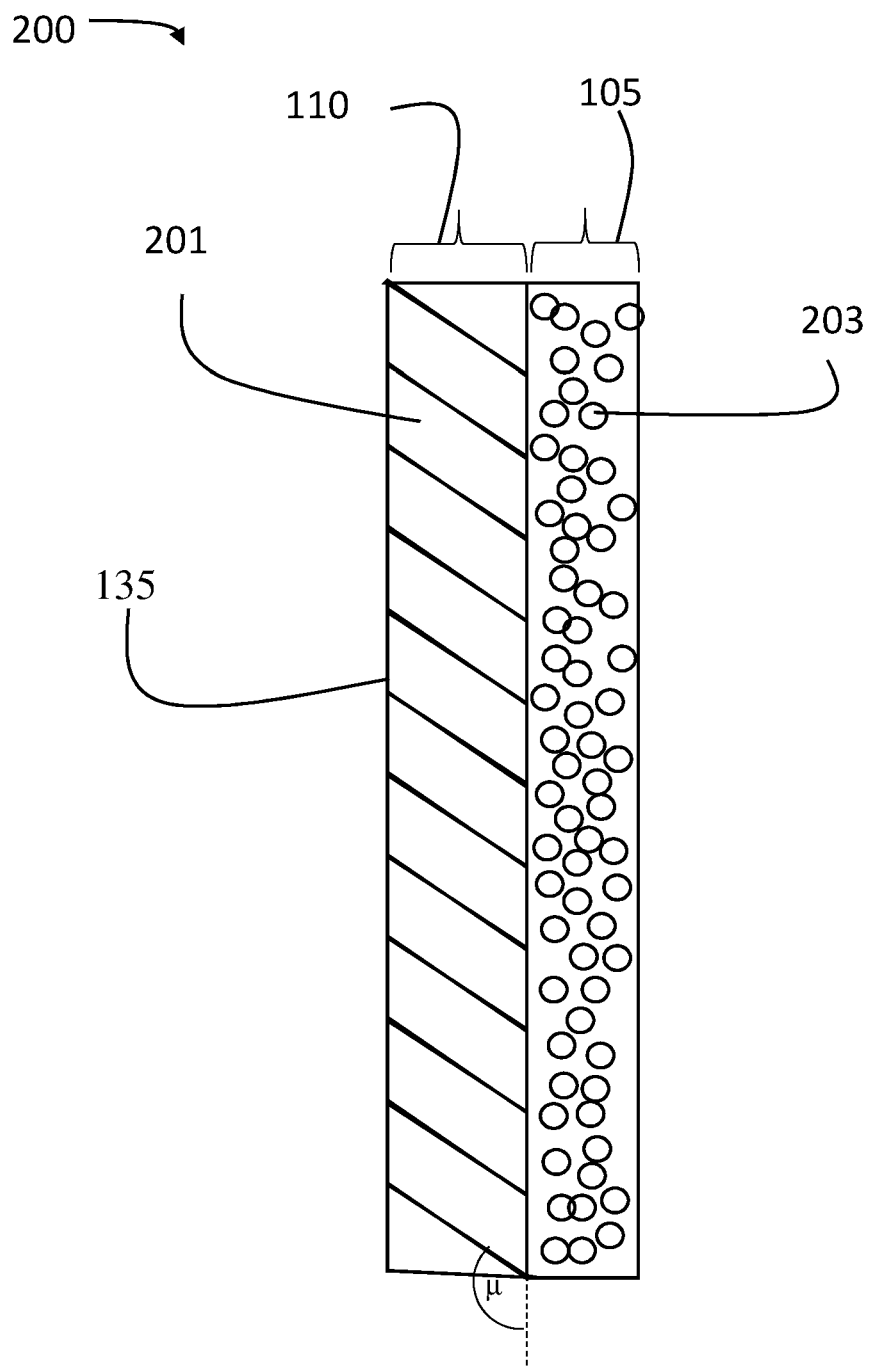
FIG. 2 shows an example arrangement of the display screen.

The bias trajectory preferably is substantially horizontal or perpendicular to the surface of the planar waveguide. In particular advantageous arrangements, the plurality of optical fibres are aligned at an oblique angle as seen in FIG. 2. As can be seen in FIG. 2, the planar waveguide 110 of display system 200 comprises a plurality of collocated optical fibres 201 wherein each of the optical fibres is set at an oblique angle with respect to the display system 200. The oblique angle, $\mu$, of the plurality of optical fibres 201 is adapted for discrimination against incident light outside an incident angle acceptance range, in the particular arrangement depicted in FIG. 2, reflector 105 adjacent the planar waveguide 110 is depicted as a plurality of retro-reflectors 203. The plurality of reflectors 203 in this particular arrangement are each retro-reflective beads. The oblique angle of each of the optical fibres 201 may preferentially be adapted so as to favour a particular desired viewing angle, for example, the desired viewing angle may lie beneath the horizontal with respect to the display system 200 and the angle of be plurality of optical fibres 201 may be configured accordingly. The angle at which the optical fibres 201 are set is correlated to the bias angle, $\mu$, described above, and therefore the bias trajectory along which light is guided within the waveguide 110.

Any of the arrangements of the display systems disclosed herein may be adapted for either front-projection or rear projection applications. The bi-directional nature of the fibre optics allow the plate to transmit and display light independent of whether it approaches from the front or back.

Figure 3A:
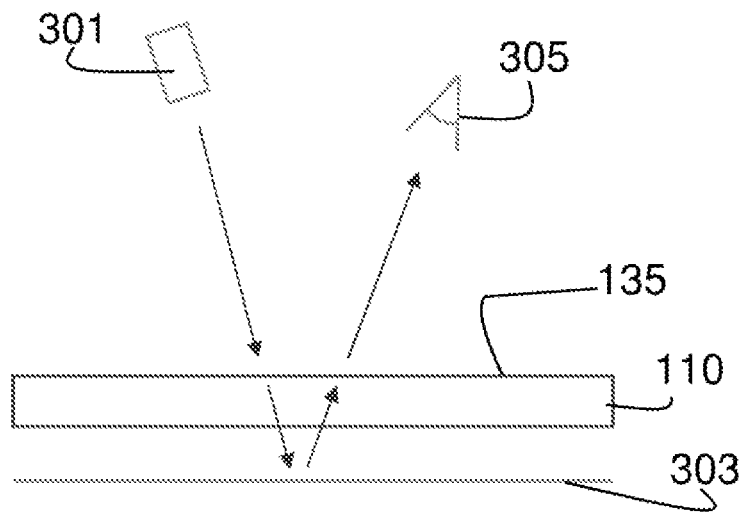
FIG. 3A depicts a schematic arrangement of the display system when operated in a front projection application.

In as front projection application as shown in FIG. 3A, the light rays from a projector 301 enter through the front surface of the planar waveguide/fibre optic plate 110, reflect off a from projection screen 303, re-enter through the back surface of the plate 110 and exit toward the user 305.

Figure 3B:
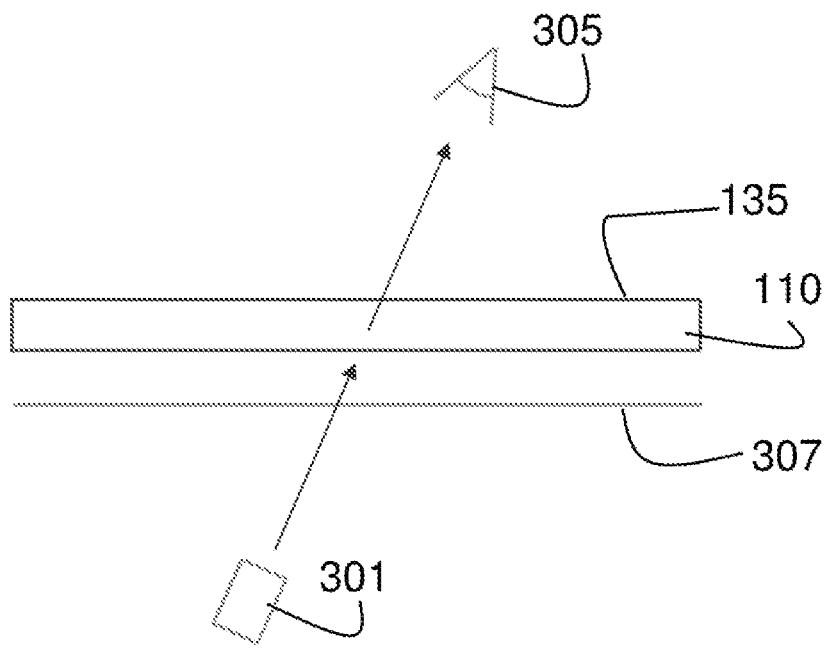
FIG. 3B depicts a schematic arrangement of the display system when operated in a rear projection application.

In a back (or 'rear') projection application as shown in FIG. 3B, the light rays from projector 301 pass through a rear-projection screen 307, enter the back surface of the plate 110 and exit toward the user 305.

In particular arrangements, a configuration of a series of mirrors and lenses (not shown) can be used to redirect/reseize the image being generated by the projector before it reaches the screens as would be appreciated by the skilled addressee.

Taking now the application as a front-projection display device as an example, the display system works on as particular sequence of layers. For front projection applications, the layers (from top to bottom) are preferably:
 a neutral density 2-layered anti-reflective coating;
 FO plate 110
 RTV615 optical coupling
 Glass bead retro-reflective projection screen
Alternatively, for rear projection applications, the layers preferably are:
 neutral density 2-layered anti-reflective coating;
 FO plate 110;
 RTV615 optical coupling;
 Rear projection screen In environments with high ambient light levels, when approaching the display at particular angles, for the system to effectively reject the ambient light, the ambient light must approach from angles outside of the characteristic acceptance cone of the FO plate 110. As a result, brightness and contrast remain constant even in the presence of high ambient light levels.

In particular arrangements, individual fibre-optic plates 110 can be placed together to form a larger display. The size of the plate is only limited depending on the magnitude of the bias cut angle, μ, and the thickness of plate required. However, a display system with a larger display area can simply be constructed with individual FO plates 110 butted next to each other. The display has some optical specifications that remain constant for all displays of different bias angles but equal Numerical Apertures. These properties include (but are not limited to):
 maximum brightness;
 transmission efficiency;
 percentage ambient light rejected;
 percentage ambient light reflected, and
 contrast ratio (with and without ambient light)

The display device also has some optical specifications (found through theory) that remain constant for all displays of equal bias angles and equal Numerical Apertures. These properties include the acceptance cone defined as the solid angle wherein light striking the optical fibre which originated within the acceptance cone will be guided by the optical fibre.

As discussed above, the FO plate 110 is comprised of a plate of meshed optic fibres 201. Such a plate may be manufactured by Incom of Charlton, Mass., USA. The plates are manufactured by adhering fibre optic strands into a mesh to form a block of material. The lock has an inherent Numerical Aperture and optical properties based on the fibre optic core and cladding diameters and material. The plate 110 is then cut from this block at a specified bias angle, μ.

The fibre optic waveguides on a single plate are therefore all aligned and exhibit the same bias cut. The unidirectional nature of all the optical fibres allows the displayed image to be displayed to the user without distortion.

Equal bias cuts across all fibres 201 of the plate 110 allows each fibre to possess an equal acceptance cone which means the entire image is displayed inside the acceptance cone and entire image is rejected outside the acceptance cone. Each fibre consists of light transmitting cylindrical core surrounded by a light transmitting cladding with lower refractive index. The relative refractive indexes of the core and cladding determine the characteristic Numerical Aperture of the FO plate based on the following equation:

$$NA = \sqrt{n_{core}^2 - n_{clad}^2}$$

Figure 4:
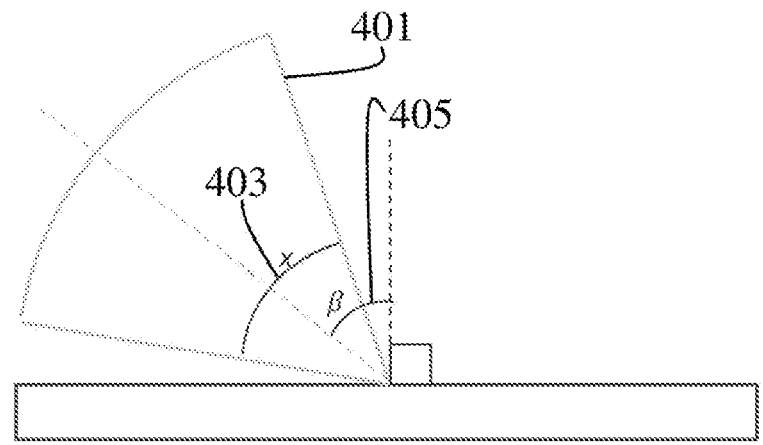
FIG. 4 depicts a schematic representation of the acceptance cone of an optical fibre utilised in the display system.

The acceptance cone is defined as the angular region within light is successfully transmitted through the plate. The acceptance cone is dependent on the Numerical Aperture and bias cut angle of the plate. The acceptance cone is fixed, and cannot be changed subsequent to manufacture of the plate 110. As can be seen in FIG. 4, the acceptance cone 401 is defined by two properties:
 The angular size 403 of the acceptance cone 401, denoted x; and
 The rotation angle 403 of the centre of the cone relative to the line normal to the surface of the plate, denoted β.

Figures 5A, 5B:
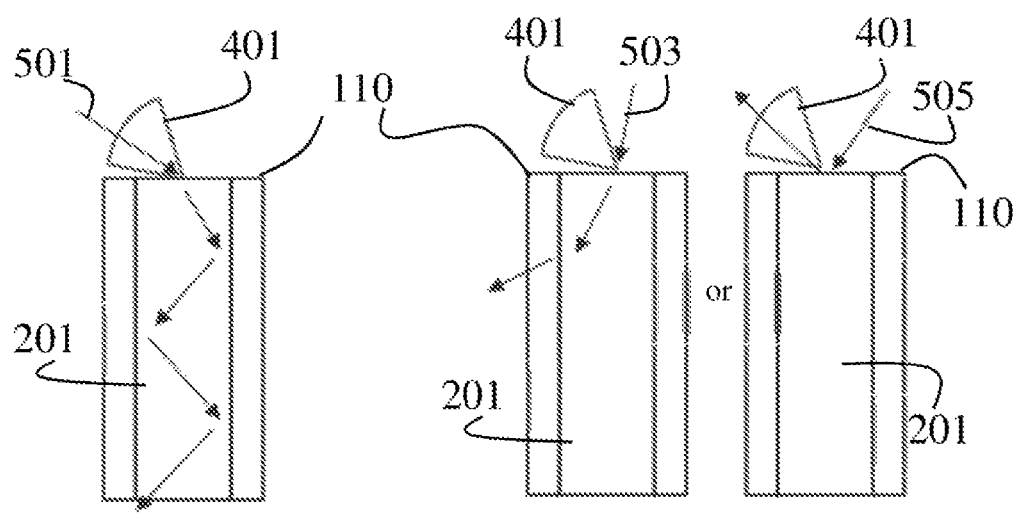
FIG. 5A depicts the trajectory of a typical light rays originating outside the acceptance cone being guided by the optical fibre.
FIG. 5B depicts the trajectory of typical light rays originating outside the acceptance cone being rejected (not guided) by the optical fibre.

Light interacting with the plate behaves differently depending on whether it approaches inside or outside of the acceptance cone;

As can be seen in FIG. 5A, light 501 entering the plate 110 inside the acceptance cone 401 experiences refraction between air and the core of optical fibre 201 and thus total internal reflection between core and cladding; allowing this light to be guided along the optical fibre 201 of the plate 110 transmitted and display an image.

Conversely, as seen in FIG. 5B, light rays entering the plate 119 out of the acceptance cone 401 (e.g. rays 503 and 505) experiences reflection from the face of the optical fibre 201 or refraction between core anti cladding of optical fibre 201; thus cans this light to be rejected and not affect the display, thereby creating a display that is resistant to ambient light.

As would be appreciated by the skilled addressee, the 110 plate exhibits a variable acceptance cone depending on the chosen material and bias angle of the optical fibres used to form the plate 110. In general, the acceptance cone size increases with material (from which the optical fibres are formed) of increasing Numerical Aperture. The acceptance cone rotation progresses further from the normal to the plate with increasing bias cut angle, μ.

Figure 6A:
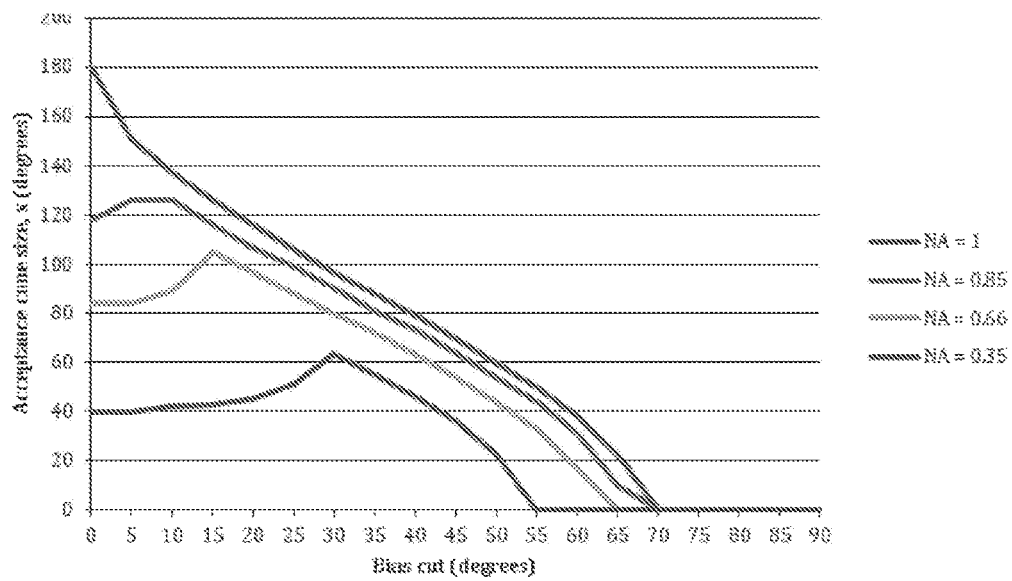
FIGS. 6A and 6B are graphs depicting the properties of the acceptance cone for an optical fibre based on the numerical aperture of the fibre and the bias angle at which the fibre is cut.
Figure 6B:
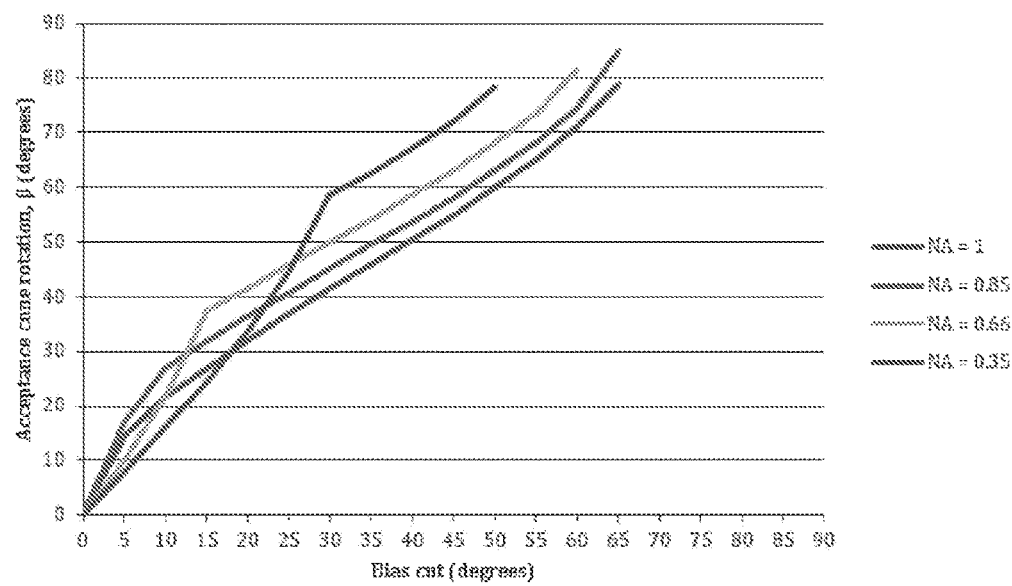

The acceptance cone has a mathematical-proven characteristic curve for its size and rotation based on the bias angle and plates with different Numerical Apertures have a characteristic curve relating the acceptance cone size with the bias cup angle. The characteristic curves are found through the iterative use of Snell's Law applied to discrete bias cut angles as would be appreciated by the skilled addressee. FIGS. 6A and 6B show example curves depicting the properties of the acceptance cone for an optical fibre based on the numerical aperture of the fibre and the bias angle (between 0 to 90° at intervals of 5°) at which the fibre is cut.

Projection Screen Layer

In front projection applications—the reflection layer is preferably made of a glass bead retro-reflective front projection screen. This layer is designed for commercial front projection applications; and a suitable layer may be obtained from Da-Lite in Warsaw, Ind., USA.

In rear projection applications—the transmission layer is made of a commercial rear projection screen. This layer is optically-coupled to the plate using, for example, RTV615 optical coupling with fixed refractive index.

Anti-Reflective Coating Layer

In particular arrangements, a neutral-density 2-layered anti-reflection coating layer is deposited onto the surface of the plate to reduce the intensity of directly reflected ambient light Curved Plates In particular arrangements, the fibre optic plate 110 may be bent or shaped in a curve to make it adaptable to a broader range of applications such as, for example, aircraft cockpit environments. If the plate is bent, the fibre optics exhibit different alignment but equal bias cut angles. Alternatively, if the plate is shaped to a curve, the fibre optics exhibit the same alignment but different bias cut angles Further Applications In further arrangements, the display screen system disclosed above for providing a display screen with sufficient ambient light rejection to permit viewing in bright environments (e.g. in full sunlight) may be applicable for operation in conjunction with various other display systems, for example, the system is applicable to be used in conjunction with LCD's, LED's, OLED's and other emissive display devices. The display screen disclosed herein for ambient light rejection may be optically coupled to any display device which produces a planar image from which light rays are at focus or originate from (e.g. an LCD, LED or OLED display screen).

The optical coupling between the display screen and the planar image producing device is achieved through a lamination process involving optical grade adhesive materials. Examples of suitable such materials are RTV6166 or RTV615 available from Momentive of Columbus, Ohio. The laminated solution removes the air gap between the two surfaces to drastically reduce internal reflections and light divergence which cause blurring and loss of contrast of the image. The lamination also mechanically couples the surfaces of the planar LCD/LED/etc. display device and the display screen together to achieve one single projection display surface. An alternative optical coupling means may include a microlens array, lenslet array screen, or lenticular lens situated between the planar LCD/LED/etc. display device and the display screen as would be appreciated by the skilled addressee.

INTERPRETATION

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first" "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: "including" or "which includes" or "that includes" as used herein is also open term that also means including at least the elements/features that follow the term, but not excluding others. Thus, "including" is synonymous with and means "comprising".

Scope of Invention

It will be appreciated that the systems and apparatus described/illustrated above at least substantially provide a display screen and in particular to a sunlight readable front- or rear-projection screen which is applicable to day and night digital signage for display applications in commercial car defence industries.

The systems and apparatus described herein, and/or shown in the drawings, are presented by way of example only and are not limiting as to the scope of the invention. Unless otherwise specifically stated, individual aspects and components of the systems and apparatus may be modified, or may have been substituted therefore known equivalents, or as yet unknown substitutes such as may be developed in the future or such as may be found to be acceptable substitutes in the future. The systems and apparatus may also be modified for a variety of applications while remaining within the scope and spirit of the claimed invention, since the range of potential applications is great, and since it is intended that the present systems and apparatus be adaptable to many such variations.

Thus, while there has been described what are believed to be the preferred embodiments of the invention, those skilled in the art will recognize that other and further modifications may be made thereto without departing from the spirit of the invention, and it is intended to claim all such changes and modifications as fall, within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the at that the invention may be embodied in many other forms.

INDUSTRIAL APPLICABILITY

It is apparent from the above, that the arrangements described are applicable to the display system industries.

The invention claimed is:

1. A display system for ambient light discrimination comprising:
   a planar waveguide comprising a plurality of collocated optic fibres; and
   a plurality of retro-reflectors,
   wherein, the planar waveguide is adapted to guide incident light within an incidence angle acceptance range and wherein the planar waveguide is adapted to guide light along a bias trajectory,
   wherein, in use, the display system is adapted for discriminating against incident light outside an incidence angle acceptance range,
   wherein the plurality of optical fibres are aligned at an oblique angle, and
   wherein the plurality of the retro-reflectors are each reflective beads.

2. The display system as claimed in claim 1, wherein the bias trajectory is substantially horizontal or perpendicular to the surface of the planar waveguide.

3. The display system as claimed in claim 1, wherein the oblique angle is adapted so as to favour a viewing angle beneath the horizontal.

4. The display system as claimed in claim 1, wherein the display system is adapted to reflect incident light outside the incidence angle acceptance range.

5. The display system as claimed in claim 1, wherein the display system is adapted to refract incident light within the incidence angle acceptance range.

6. The display system as claimed in claim 1, comprising a planar waveguide wherein, in use, the planar waveguide is adapted to guide incident light within the incidence angle acceptance range.

7. The display system as claimed in claim 6, wherein, in use, the planar waveguide is adapted to propagate light along a bias trajectory.

8. The display system as claimed in claim 7, wherein the bias trajectory is substantially perpendicular a surface of the planar waveguide.

9. The display system as claimed in claim 7, wherein the bias trajectory is configured in accordance with a desired viewing angle.

10. The display system as claimed in claim 9, wherein the bias trajectory is offset an axis substantially perpendicular a surface of the planar waveguide.

11. The display system as claimed in claim 7, wherein the light propagation trajectory is uniform across the planar waveguide.

12. The display system as claimed in claim 7, wherein the light propagation trajectory has as a focal point.

13. The display system as claimed in claim 1, wherein the display system is configured in accordance with a desired refractive index.

14. The display system as claimed in claim 13, further comprising a matte surface treatment selected in accordance with the desired refractive index.

15. A display system for ambient light discrimination comprising:
    a projector for projecting an image onto a projection screen;
    a planar waveguide comprising a plurality of collocated collimated optic fibres, said planar waveguide located adjacent said projection screen and adapted to guide light from said projection screen to a display surface wherein the plurality of collocated collimated optical fibres comprise optic fibre core and cladding material, wherein the optic fiber core and cladding materials are each configured with a desired refractive index so that the waveguide is adapted with a defined angular bias trajectory of the collocated collimated optic fibres to produce a display system configured for viewing with a specific acceptance angular range;
    wherein, the planar waveguide is adapted to guide incident light originating from said projection screen and impinging on said waveguide within an incidence angle acceptance range and wherein the planar waveguide is adapted to guide light along a bias trajectory to said display surface such that, in use, the display system is adapted for discriminating against incident light outside the specific acceptance angular range; and
    a plurality of retro-reflectors, and wherein each of the retro-reflectors of the plurality of retro-reflectors is a reflective bead.

16. The display system of claim 15 wherein the optic fibre core and the cladding material comprise relative refractive indexes to determine an acceptance cone.

17. A display system for ambient light discrimination, comprising:
    a planar waveguide comprising a plurality of collocated collimated optical fibres each having an optic fibre core and cladding material, wherein the optic fibre core and cladding materials are each configured with a desired refractive index so that the waveguide is adapted with a defined angular bias trajectory of the collocated collimated optic fibres to produce a display system configured for viewing with a specific acceptance angular range; and
    a plurality of retro-reflectors wherein each of the retro-reflectors of the plurality of retro-reflectors is a reflective bead.

18. The display system of claim 17 further comprising a matte surface treatment selected in accordance with the desired refractive index.

19. The display system of claim 17 wherein the optic fiber core and cladding material comprise relative refractive indexes to determine an acceptance cone.

* * * * *